US012347261B2

(12) United States Patent
Zou

(10) Patent No.: US 12,347,261 B2
(45) Date of Patent: Jul. 1, 2025

(54) CONVEYING DEVICE, PIZZA VENDING MACHINE, AND AUTOMATIC PIZZA SELLING SYSTEM

(71) Applicant: GUANGZHOU LIGHT INDUSTRY ELEC CO., LTD, Guangzhou (CN)

(72) Inventor: Jiafu Zou, Lechang (CN)

(*) Notice: Subject to any disclaimer, the term of this patent is extended or adjusted under 35 U.S.C. 154(b) by 991 days.

(21) Appl. No.: 17/331,629

(22) Filed: May 26, 2021

(65) Prior Publication Data

US 2022/0383690 A1 Dec. 1, 2022

(51) Int. Cl.
| | |
|---|---|
| *G07F 17/00* | (2006.01) |
| *A21B 1/48* | (2006.01) |
| *A21B 3/02* | (2006.01) |
| *A21D 13/41* | (2017.01) |
| *B65G 1/04* | (2006.01) |
| *G06Q 20/32* | (2012.01) |

(52) U.S. Cl.
CPC ............ *G07F 17/0078* (2013.01); *A21B 1/48* (2013.01); *A21B 3/02* (2013.01); *A21D 13/41* (2017.01); *B65G 1/04* (2013.01); *G06Q 20/327* (2013.01)

(58) Field of Classification Search
CPC ..... G07F 17/0078; A47J 44/00; A47J 37/044; A47J 37/045; A21D 13/41; A21B 1/48; A21B 3/02; B65G 1/04; G06Q 20/327
USPC .......................................................... 99/357
See application file for complete search history.

(56) References Cited

U.S. PATENT DOCUMENTS

| | | | | |
|---|---|---|---|---|
| 8,710,408 | B2* | 4/2014 | Khatchadourian | ...... A21D 8/02 219/400 |
| 10,681,916 | B2* | 6/2020 | Hamon | .................. A21C 14/00 |
| 2001/0002674 | A1* | 6/2001 | Gubbini | .................. G07F 9/105 221/13 |
| 2002/0176921 | A1* | 11/2002 | Torghele | ................ A21C 1/142 426/549 |

(Continued)

FOREIGN PATENT DOCUMENTS

| | | | |
|---|---|---|---|
| CN | 103300079 | * | 9/2013 |
| CN | 106170208 | * | 11/2016 |

(Continued)

OTHER PUBLICATIONS

CN215182218 (Year: 2024).*
CN215123719 (Year: 2024).*
CN215126543 (Year: 2024).*

(Continued)

*Primary Examiner* — Steven W Crabb
*Assistant Examiner* — Fahmida Ferdousi
(74) *Attorney, Agent, or Firm* — Addison D. Ault; IPGentleman Intellectual Property Services, LLC

(57) ABSTRACT

The present disclosure provides a pizza vending machine and an automatic pizza selling system. The pizza vending machine includes a first cabinet with a first window, a second cabinet arranged on one side of the first cabinet with a second window corresponding to the first window, a pizza storage device arranged in the first cabinet to store pizza, a conveying device arranged in the first cabinet and corresponding to the first window, a pizza baking and feeding device arranged in the second cabinet and corresponding to the second window to make a baked pizza to be packaged out, and a packaging box storage device arranged in the second cabinet and corresponding to the pizza baking and feeding device to make a packaging box fall into the pizza baking and feeding device to complete packaging.

14 Claims, 7 Drawing Sheets

(56) References Cited

U.S. PATENT DOCUMENTS

| | | | | |
|---|---|---|---|---|
| 2012/0185086 | A1* | 7/2012 | Khatchadourian | G07F 11/70 99/345 |
| 2012/0263847 | A1* | 10/2012 | Poli | G07F 9/105 426/520 |
| 2014/0087048 | A1* | 3/2014 | Webster | A21C 9/04 83/76.1 |
| 2014/0224826 | A1* | 8/2014 | Otzen | G07F 11/10 221/1 |
| 2019/0139353 | A1* | 5/2019 | Barnum | G07F 9/105 |
| 2019/0371109 | A1* | 12/2019 | Yang | G07F 11/70 |
| 2021/0390818 | A1* | 12/2021 | Shue | G07F 17/0078 |

FOREIGN PATENT DOCUMENTS

| | | | |
|---|---|---|---|
| CN | 212782162 | * | 3/2021 |
| EP | 1107199 | * | 6/2001 |
| JP | 200993458 | * | 4/2009 |
| WO | WO9504334 | * | 2/1995 |
| WO | WO2008103907 | * | 8/2008 |

OTHER PUBLICATIONS

CN212782162 (Year: 2024).*
CN114241668 (Year: 2024).*
WO2023170617 (Year: 2024).*
CN215182260 (Year: 2024).*
EP1107199 (Year: 2024).*
CN106170208 (Year: 2024).*
EP1399024 (Year: 2024).*
WO2019094610 (Year: 2024).*
CN103300079 (Year: 2024).*
JP200993458 (Year: 2024).*
WO9504334 (Year: 2024).*
WO2008/103907 (Year: 2024).*

* cited by examiner

# CONVEYING DEVICE, PIZZA VENDING MACHINE, AND AUTOMATIC PIZZA SELLING SYSTEM

TECHNICAL FIELD

The present disclosure relates to a field of unmanned smart equipment technology, and in particular to a pizza vending machine and an automatic pizza selling system.

BACKGROUND

With rapid development of the economy, people's life pace is getting faster and faster. People are in such a fast life, so people often choose some take-out instead of cooking. Thus, a wide range of fast foods becomes a choice of people. Pizza is one of the fast foods, which originated in Italy and gradually became popular in the world. However, people need to go to a special pizza store when purchasing pizza, and the pizza stores are not necessarily in every region, which has a certain limitation and leads to people to be unable to eat pizza at some areas and therefore difficult to meet people's appetite demand. Therefore, there is a need for a pizza vending machine that realizes automatic sale of pizzas, and is able to be moved at any time so that people are able to buy a pizza in a mall or a street. At present, vending machines, such as ice cream vending machine and other automatic selling machines have been used in large numbers. However, there are relatively few vending machines for making and selling pizzas, and these vending machines for selling pizzas have problem of insufficiency or insufficient applicability to meet market demand.

SUMMARY

An object of the present disclosure is to provide a conveying device arranged in a pizza vending machine to solve problems mentioned above.

Another object of the present disclosure is to provide a pizza vending machine to solve the problems mentioned above.

Another object of the present disclosure is to provide an automatic pizza selling system to solve the problems mentioned above.

Technical schemes of the present disclosure are as follows.

The present disclosure provides the conveying device arranged in the pizza vending machine. The conveying device comprises a first driving mechanism, a first guide rail, a first moving base, a second moving base, a second driving mechanism, a third moving base, and a conveying mechanism. The second driving mechanism is arranged on the first moving base. The third moving base is connected with a moving end of the second driving mechanism. The conveying mechanism is arranged on the third moving base. The first driving mechanism and the first guide rail are arranged side by side on a box body of the pizza vending machine. The first moving base is fixed on a moving end of the first driving mechanism. The second moving base is fixed on a moving end of the first guide rail.

The conveying mechanism comprises a rotating unit, a conveying unit, and a pushing unit. The rotating unit is arranged on the third moving base. The conveying unit is arranged on the rotating unit. The pushing unit is arranged on the conveying unit.

Furthermore, a first positioning rod is connected between one end of the first moving base and one end of the first guide rail. The one end of the first moving base and the one end of the first guide rail are arranged at a same side of the conveying device. The first positioning rod is connected with the box body of the pizza vending machine.

Furthermore, the first driving mechanism is a first linear motor.

Furthermore, the second driving mechanism is a second linear motor.

Furthermore, the rotating unit comprises a first motor, a first rotating shaft, a pulley transmission mechanism, and a first rotating base. The first motor is arranged on the third moving base. A bottom portion of the first rotating shaft is rotatably arranged on one side of the first motor. The bottom portion of the first rotating shaft and an output end of the first motor are driven by the pulley transmission mechanism. A top portion of the first rotating shaft is fixed with the first rotating base. The conveying unit is arranged on the first rotating base.

Furthermore, the conveying unit comprises a fourth moving base, a second motor, a first screw transmission mechanism, and a first gear transmission mechanism. The second motor is arranged on the first rotating base. The first screw transmission mechanism is arranged on the first rotating base along a pizza conveying and discharging direction. One end of the first screw transmission mechanism is connected with an output end of the second motor through the first gear transmission mechanism. A moving end of the first screw transmission mechanism is connected with the fourth moving base.

Furthermore, the pushing unit comprises a third motor, a second screw transmission mechanism, and a second gear transmission mechanism. An end surface of the fourth moving base facing away from the first gear transmission mechanism is connected with a pushing plate through the second screw transmission mechanism. Second discharging columns parallel to the second screw transmission mechanism are arranged on the fourth moving base. The pushing plate is sleeved on the second discharging columns. The third motor is arranged on the fourth moving base. An output end of the third motor is connected to one end of the second screw transmission mechanism through the second gear transmission mechanism.

The present disclosure provides the pizza vending machine. The pizza vending machine comprises a first cabinet provided with a first window, a second cabinet arranged on one side of the first cabinet and provided with a second window corresponding to the first window, a pizza storage device arranged in the first cabinet to store pizza, a conveying device arranged in the first cabinet and corresponding to the first window, a pizza baking and feeding device, and a packaging box storage device arranged in the second cabinet.

The conveying device is arranged on the side of the pizza storage device to take a pizza out from the pizza storage device and transfer the pizza out of the first cabinet from a feeding window. The pizza baking and feeding device is arranged in the second cabinet and corresponding to the second window to make a baked pizza to be packaged and taken out. The packaging box storage device is arranged corresponding to the pizza baking and feeding device and is arranged in the second cabinet to make a packaging box falling into the pizza baking and feeding device to complete packaging.

Furthermore, the conveying device comprises a first driving mechanism, a first guide rail, a first moving base, a second moving base, a second driving mechanism, a third moving base, and a conveying mechanism. The first driving mechanism is fixed on an inner bottom portion of the first cabinet. A moving end of the first driving mechanism is connected with the first moving base. A bottom end of the second driving mechanism is vertically connected with the first moving base. The first guide rail is parallel to the first driving mechanism and is fixed on an inner top portion of the first cabinet. A moving end of the first guide rail is connected with the second moving base. A top end of the second driving mechanism is connected to the second moving base. A moving end of the second driving mechanism is connected with the third moving base. The conveying mechanism is arranged on the third moving base. One end of the first driving mechanism is connected with one end of the first guide rail through a first positioning rod. The first positioning rod is fixed to a side wall of the first cabinet.

Furthermore, the conveying mechanism comprises a first motor, a first rotating shaft, a pulley transmission mechanism, a first rotating base, a fourth moving base, a second motor, a first screw transmission mechanism, a first gear transmission mechanism, a third motor, a second screw transmission mechanism, and a second gear transmission mechanism. The first motor is arranged on the third moving base. A bottom portion of the first rotating shaft is rotatably arranged on one side of the first motor. The bottom portion of the first rotating shaft and an output end of the first motor are driven by the pulley transmission mechanism. A top portion of the first rotating shaft is fixed with the first rotating base. The second motor is arranged on the first rotating base. The first screw transmission mechanism is arranged on the first rotating base along a pizza conveying and discharging direction. One end of the first screw transmission mechanism is connected with an output end of the second motor through the first gear transmission mechanism. A moving end of the first screw transmission mechanism is connected with the fourth moving base. An end surface of the fourth moving base facing away from the first gear transmission mechanism is connected with a pushing plate through the second screw transmission mechanism. Second discharging columns parallel to the second screw transmission mechanism are arranged on the fourth moving base. The pushing plate is sleeved on the second discharging columns. The third motor is arranged on the fourth moving base. An output end of the third motor is connected to one end of the second screw transmission mechanism through the second gear transmission mechanism.

Furthermore, the pizza storage device comprises a fourth motor, a first reducer, a second rotating shaft, a first connecting base, a second connecting base, a plurality of first supporting plates, and a plurality of first supporting frames. The fourth motor is arranged in the first cabinet. An output end of the fourth motor is connected with an input end of the first reducer. An output end of the first reducer is keyed to the first connecting base. The second rotating shaft is arranged in the first cabinet through a first bearing. The second connecting base is keyed to the second rotating shaft. The first connecting base and the second connecting base are arranged opposite to each other. A bottom end of each first supporting plate is fixed to the first connecting base. A top end of each first supporting plate is fixed to the second connecting base. The plurality of first supporting frames are arranged on each first supporting plates at intervals. A root portion of each first supporting frame is connected to a corresponding first supporting plate. Each first supporting frame extends away from a central axis of the second rotating shaft. First discharging columns are arranged at intervals on an end surface of each first supporting frame facing away from the corresponding first supporting plate.

Furthermore, the pizza baking and feeding device comprises the baking unit and the loading unit. The baking unit comprises a baking box, a fifth motor, a conveying belt, third discharging columns, a sixth motor, a third screw transmission mechanism, a seventh motor, and a fourth screw transmission mechanism. The baking box is arranged in the second cabinet. The baking box comprises a feeding inlet corresponding to the second window. The baking box comprises a discharge outlet on an end surface of the baking box towards the loading unit. Heating pipes are respectively arranged on a top portion and a bottom portion of the baking box. The fifth motor is arranged on one side of the baking box. The conveying belt is arranged in the baking box and is arranged between the heating pipes. The third discharging columns are arranged on the conveying belt at intervals. An output end of the fifth motor is connected to the conveying belt through a third gear transmission mechanism. The sixth motor is fixed above the feeding inlet. A first blocking door is movable up and down to block the feeding inlet. The third screw transmission mechanism is vertically arranged on the first blocking door. A moving end of the third screw transmission mechanism is connected to the first blocking door.

An output end of the sixth motor is drivingly connected with one end of the third screw transmission mechanism. First guide rods are arranged on a side of the baking box where the feeding inlet is located. First guide blocks are arranged on the first blocking door. Each first guide rod passes through a respective first guide block. The seventh motor is fixed above the discharge outlet. A second blocking door is movable up and down to block the discharge outlet. The fourth screw transmission mechanism is vertically arranged on the second blocking door. A moving end of the fourth screw transmission mechanism is connected to the second blocking door. An output end of the seventh motor is drivingly connected with one end of the fourth screw transmission mechanism. Second guide rods are arranged on a side of the baking box where the discharge outlet is located. Second guide blocks are arranged on the second blocking door. Each second guide rod passes through a respective second guide block. The loading unit is arranged on one side of the baking box. The loading unit is corresponding to the discharge outlet.

Furthermore, the loading unit comprises a machine table, an upper supporting mechanism, and a box packaging mechanism.

The upper supporting mechanism comprises a fixing base, an eighth motor, a fifth screw transmission mechanism, a fourth gear transmission mechanism, and a conveying platform. The machine table comprises a loading window. The fixing base is corresponds to the loading window and is arranged on the machine table. The eighth motor is fixed on the fixing base. A moving end of the fifth screw transmission mechanism is fixed on the fixing base. The fifth screw transmission mechanism is drivingly connected to an output end of the eighth motor through the fourth gear transmission mechanism. A top portion of the fifth screw transmission mechanism is connected with the conveying platform. First suction cups are arranged on an upper surface of the conveying platform.

Two third guide rods are arranged side by side on two sides of the fifth screw transmission mechanism. The two third guide rods pass through the fixing base and the conveying platform in sequence.

The box packaging mechanism is arranged on one side of the loading window.

Furthermore, the box packaging mechanism comprises a ninth motor, a sixth screw transmission mechanism, an unloading pushing plate, a limit plate, a tenth motor, and a box opening block. The ninth motor is fixed on the machine table; an output end of the ninth motor is drivingly connected with the sixth screw transmission mechanism. The sixth screw transmission mechanism is arranged on the machine table along a pizza discharging direction. A moving end of the sixth screw transmission mechanism is connected to the unloading pushing plate. The unloading pushing plate is arranged above the conveying platform. The limit plate is vertically arranged on one side of the machine table. An arc-shaped limit groove is arranged on the limit plate. The tenth motor is fixed on one side of the limit plate. The tenth motor is located at an arc center of an arc where the limit groove is located. The box opening block is arranged in an inverted "L" shape. One end of the box opening block extends from the limit groove and is arranged above the conveying platform. Second suction cups are connected to an extended end of the box opening block.

Furthermore, the packaging box storage device comprises a storage box, an eleventh motor, a seventh screw transmission mechanism, a box pushing plate, a twelfth motor, an eighth screw transmission mechanism, a box compacting plate, and a clamping mechanism. The storage box is arranged above the pizza baking and feeding device. The storage box comprises a box outlet configured to move the packaging box to the pizza baking and feeding device. The eleventh motor is fixed on an outer side wall of the storage box. An output end of the eleventh motor is drivingly connected with one end of the seventh screw transmission mechanism. The seventh screw transmission mechanism is arranged on the storage box along a packing box feeding direction. A moving end of the seventh screw transmission mechanism is connected to the box pushing plate. The box pushing plate extends into the storage box to push the packaging box stored in the storage box to the box outlet. The twelfth motor is fixed on an outer side wall close to the box outlet of the storage box. An output end of the twelfth motor is drivingly connected with one end of the eighth screw transmission mechanism. The eighth screw transmission mechanism is vertically arranged above the twelfth motor. A moving end of the eighth screw transmission mechanism is connected to the box compacting plate. The box compacting plate extends into the storage box to compact stacked packaging boxes. The clamping mechanism is arranged on one side of the box outlet and is arranged on a bottom portion of the storage box.

Furthermore, the clamping mechanism comprises a clamping motor, a ninth screw transmission mechanism, and a clamping plate, the clamping motor is fixed on a bottom portion of the storage box. An output end of the clamping motor is drivingly connected with the ninth screw transmission mechanism. The ninth screw transmission mechanism is horizontally arranged on a side of the box outlet. A moving end of the ninth screw transmission mechanism is connected to the clamping plate. The clamping plate extends into the storage box to make a bottommost packaging box of the stacked packaging boxes abutting against an inner side wall of the storage box.

An end surface of the clamping plate towards the storage box is a plane.

The present disclosure provides an automatic pizza selling system. The automatic pizza selling system comprises an pizza vending machine, a control device electrically connected to the pizza vending machine and configured to obtain an order payment completion signal to turn on the pizza vending machine, a coin device connected with the control device, and a mobile payment device connected with the control device.

The coin device is configured to generate the order payment completion signal after a user puts a minor or currency, then the coin device transmits the order payment completion signal to the control device. The mobile payment device is configured to generate the order payment completion signal after the user scans a payment code, then the mobile payment device transmits the order payment completion signal to the control device.

Furthermore, the pizza vending machine comprises a first cabinet provided with a first window, a second cabinet arranged on one side of the first cabinet and provided with a second window corresponding to the first window, a pizza storage device arranged in the first cabinet to store pizza, a conveying device arranged in the first cabinet and corresponding to the first window, a pizza baking and feeding device, and a packaging box storage device arranged in the second cabinet.

The conveying device is arranged on the side of the pizza storage device to take a pizza out from the pizza storage device and transfer the pizza out of the first cabinet from a feeding window. The pizza baking and feeding device comprises a baking unit and a loading unit. The baking unit is arranged in the second cabinet and is corresponding to the second window. The loading unit is arranged on one side of the baking unit. The packaging box storage device is arranged corresponding to the pizza baking and feeding device and is arranged in the second cabinet to make a packaging box falling into the pizza baking and feeding device to complete packaging.

Furthermore, the conveying device comprises a first driving mechanism, a first guide rail, a first moving base, a second moving base, a second driving mechanism, a third moving base, and a conveying mechanism. The first driving mechanism is fixed on an inner bottom portion of the first cabinet. A moving end of the first driving mechanism is connected with the first moving base. A bottom end of the second driving mechanism is vertically connected with the first moving base. The first guide rail is parallel to the first driving mechanism and is fixed on an inner top portion of the first cabinet. A moving end of the first guide rail is connected with the second moving base. A top end of the second driving mechanism is connected to the second moving base. A moving end of the second driving mechanism is connected with the third moving base. The conveying mechanism is arranged on the third moving base. One end of the first driving mechanism is connected with one end of the first guide rail through a first positioning rod. The first positioning rod is fixed to a side wall of the first cabinet.

Furthermore, the conveying mechanism comprises a first motor, a first rotating shaft, a pulley transmission mechanism, a first rotating base, a fourth moving base, a second motor, a first screw transmission mechanism, a first gear transmission mechanism, a third motor, a second screw transmission mechanism, and a second gear transmission mechanism. The first motor is arranged on the third moving base. A bottom portion of the first rotating shaft is rotatably arranged on one side of the first motor. The bottom portion of the first rotating shaft and an output end of the first motor are driven by the pulley transmission mechanism. A top portion of the first rotating shaft is fixed with the first rotating base. The second motor is arranged on the first rotating base. The first screw transmission mechanism is arranged on the first rotating base along a pizza conveying and discharging direction. One end of the first screw transmission mechanism is connected with an output end of the second motor through the first gear transmission mechanism. A moving end of the first screw transmission mechanism is connected with the fourth moving base. An end surface of the fourth moving base facing away from the first gear transmission mechanism is connected with a pushing plate through the second screw transmission mechanism. Second discharging columns parallel to the second screw transmission mechanism are arranged on the fourth moving base; the pushing plate is sleeved on the second discharging columns. The third motor is arranged on the fourth moving base. An output end of the third motor is connected to one end of the second screw transmission mechanism through the second gear transmission mechanism.

The present disclosure discloses the pizza vending machine including the first cabinet provided with the first window, the second cabinet arranged on one side of the first cabinet and provided with the second window corresponding to the first window, the pizza storage device arranged in the first cabinet to store the pizzas, the conveying device arranged in the first cabinet and corresponding to the first window, the pizza baking and feeding device, and the packaging box storage device arranged in the second cabinet. The conveying device is arranged on the side of the pizza storage device to take the pizza out from the pizza storage device and transfer the pizza out of the first cabinet from the feeding window. The pizza baking and feeding device comprises the baking unit and the loading unit. The baking unit is arranged in the second cabinet and is corresponding to the second window. The loading unit is arranged on one side of the baking unit. The packaging box storage device is arranged corresponding to the pizza baking and feeding device and is arranged in the second cabinet to make the packaging box falling into the pizza baking and feeding device to complete packaging.

This pizza vending machine may be placed in malls, streets, and other people's intensive places, which is convenient for people to buy the pizza when they over time or get off work. Moreover, the pizza vending machine achieves unmanned baking, packaging and trafficking, which is very convenient and fast and is suitable for people lived in quick-paced life. In addition, baking and packaging of the pizza are realized by providing the pizza storage device, the conveying device, the pizza baking and feeding device, and the packaging box storage device in the present disclosure. A whole process is reliable, the operation is simple, fast, and time-consuming, and further meets the fast food demand for people.

The present disclosure will be further illustrated in connection with the accompanying drawings and embodiments.

BRIEF DESCRIPTION OF DRAWINGS

The drawings are included to provide a further understanding of embodiments of the present disclosure, which form portions of the specification and are used to illustrate implementation manners of the present disclosure and are intended to illustrate operating principles of the present disclosure together with the description. Apparently, the drawings in the following description are merely some of the embodiments of the present disclosure, and those skilled in the art are able to obtain other drawings according to the drawings without contributing any inventive labor. In the drawing.

DETAILED DESCRIPTION

Figure 1:
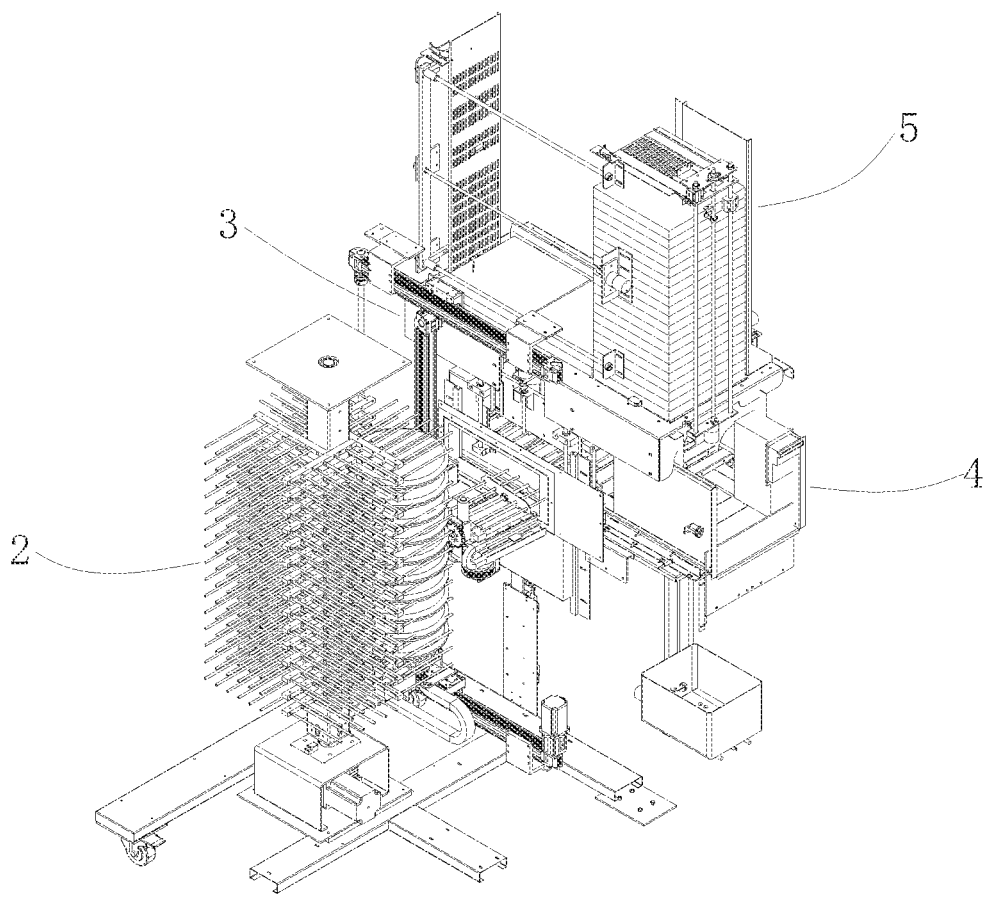
FIG. 1 is a schematic diagram of a pizza vending machine according to one embodiment of the present disclosure.
Figure 2:
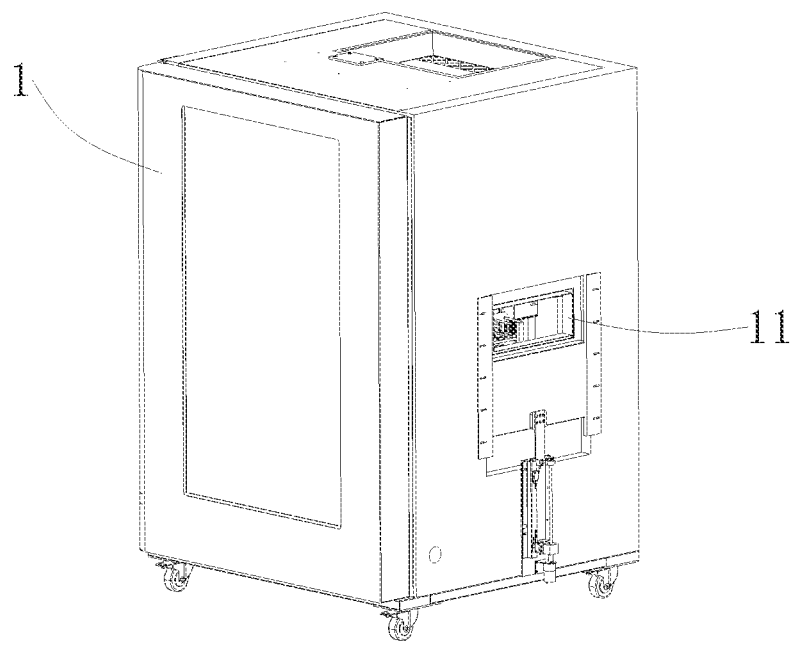
FIG. 2 is a schematic diagram of a first cabinet according to one embodiment of the present disclosure.
Figure 3:
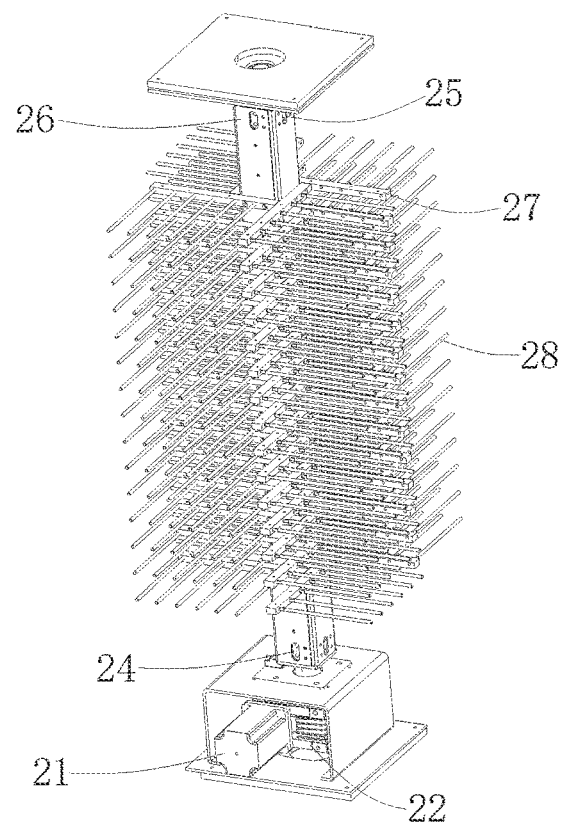
FIG. 3 is a first schematic diagram of a pizza storage device according to one embodiment of the present disclosure.
Figure 4:
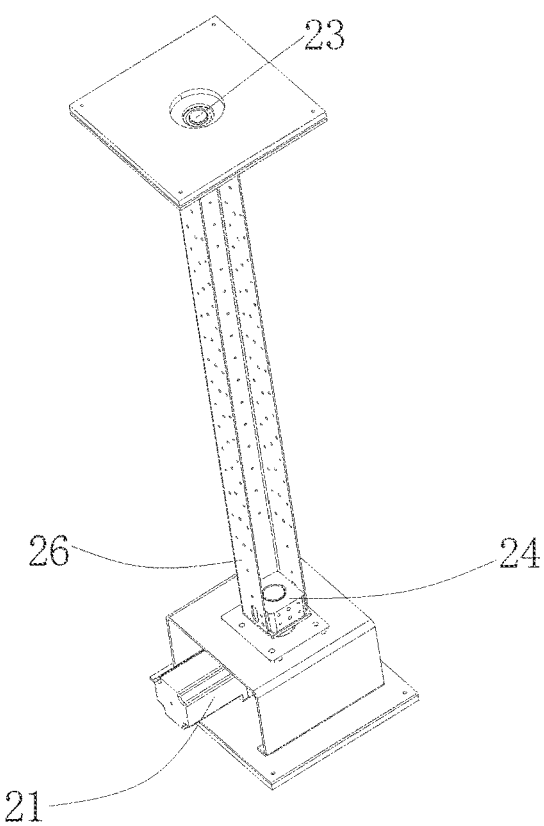
FIG. 4 is a second schematic diagram of the pizza storage device according to one embodiment of the present disclosure.

In order to make the above objects, features, and advantages of the present disclosure clear and understood, specific embodiments of the present disclosure will be described in detail below with reference to the accompanying drawings. Many specific details are set forth in the following description to fully illustrate the present disclosure. However, the present disclosure can be implemented in many other ways different from that described herein, and those skilled in the art are ale to do similar improvements without departing from the connotation of the present disclosure, and thus the present disclosure is not limited by the specific embodiments disclosed below.

It should be understood in the description of the present disclosure that terms such as "upper", "lower", "front", "rear", "left", "right", "vertical", "horizontal", "top", "bottom", "inner", "outer", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure.

It should be understood in the description of the present disclosure that terms such as "first" and "second" are only used for the purpose of description, rather than being understood to indicate or imply relative importance or hint the number of indicated technical features. Thus, the feature limited by "first" and "second" can explicitly or impliedly include at least one feature. In the description of the present disclosure, the meaning of "a plurality of" is at least two, e. g., two or three, or more unless otherwise specified.

It should be understood in the description of the present disclosure that when a component is considered to be "connected" another element, it may be directly connected to the another element or there may be an intermediate element. In contrast, when the element is "directly connected" with the another component, there is no intermediate element.

As shown in FIGS. 1-14, the present disclosure provides a pizza vending machine according to one optional embodiment of the present disclosure. The pizza vending machine comprises a first cabinet 1 provided with a first window 11, a second cabinet arranged on one side of the first cabinet 1 and provided with a second window corresponding to the first window 11, a pizza storage device 2 arranged in the first cabinet 1 to store pizza, a conveying device 3 arranged in the first cabinet 1 and corresponding to the first window 11, a pizza baking and feeding device 4, and a packaging box storage device 5 arranged in the second cabinet.

The conveying device 3 is arranged on the side of the pizza storage device 2 to take a pizza out from the pizza storage device 2 and transfer the pizza out of the first cabinet 1 from a feeding window. The pizza baking and feeding device 4 is arranged in the second cabinet and corresponding to the second window to make the baking pizza to be packaged and taken out. The packaging box storage device 5 is arranged corresponding to the pizza baking and feeding device 4 and is arranged in the second cabinet to make a packaging box fall into the pizza baking and feeding device 4 to complete packaging.

In the embodiment, a conventional cooling device is arranged on a top portion of the first cabinet 1. The cooling device is configured to cool an interior of the first cabinet 1, so that pizzas in the first cabinet 1 are stored at a low temperature. A pulling door is arranged on the first cabinet 1, which is convenient for an operator to put the pizzas into the pizza storage device 2. Therefore, the pizzas in the pizza storage device 2 are supplemented or replaced. Further, a closed door is arranged on the first window 11, which is turned on and off by a motor. In normal use, the closed door is in a closed state, when a pizza is sent to the pizza baking and feeding device 4, the closed door is opened, the conveying device 3 passes through and first window 11 and transfers the pizza to the pizza baking and feeding device 4.

Similarly, another closed door is also arranged at the second window of the second cabinet, and a principle of the another closed door is same as the closed door of the first cabinet 1, which is omitted herein.

As shown in FIGS. 1-4, in the pizza vending machine according to one optional embodiment of the present disclosure, the pizza storage device 2 comprises a fourth motor 21, a first reducer 22, a second rotating shaft 23, a first connecting base 24, a second connecting base 25, a plurality of first supporting plates 26, and a plurality of first supporting frames 27. The fourth motor 21 is arranged in the first cabinet 1. An output end of the fourth motor 21 is connected with an input end of the first reducer 22. An output end of the first reducer 22 is keyed to the first connecting base 24. The second rotating shaft 23 is arranged in the first cabinet 1 through a first bearing. The second connecting base 25 is keyed to the second rotating shaft 23. The first connecting base 24 and the second connecting base 25 are arranged opposite to each other. A bottom end of each first supporting plate 26 is fixed to the first connecting base 24. A top end of each first supporting plate 26 is fixed to the second connecting base 25. The plurality of first supporting frames 27 are arranged on each first supporting plates 26 at intervals. A root portion of each first supporting frame 27 is connected to a corresponding first supporting plate 26. Each first supporting frame 27 extends away from a central axis of the second rotating shaft 23. First discharging columns 28 are arranged at intervals on an end surface of each first supporting frame 27 facing away from the corresponding first supporting plate 26.

In the embodiment, the number of the first supporting plate 26 is four. A shape of the first connecting base 24 and the second connecting base 25 is formed. When top portions of the four first supporting plates 26 and bottom portions of the four supporting plate 26 are respectively connected with the second connecting base 25 and the first connecting base 24, the four first supporting plates 26 form a cuboid around the first connecting base 24 and the second connecting base 25. Fifteen first supporting frames 27 are connected with each first supporting plate 26 by screws. Therefore, sixty first supporting frames 27 are connected with the four first supporting plates 26. That is, the pizza storage device 2 is able to store sixty pizzas at a time, and the sixty pizzas are placed independently from each other without affecting each other, ensuring independence of each pizza.

In addition, each first supporting frame 27 is connected with six first discharging columns 28. The six first discharging columns 28 are arranged at intervals, which facilitates conveying of the conveying device 3. In addition, a contact area between a bottom portion of each pizza and corresponding first discharging columns 28 is small, so the bottom portion of each pizza is not easily adhered to the corresponding first discharging columns 28, ensuring integrity of each pizza.

When a pizza is to be taken, the pizzas on one first supporting plate 26 facing a side of the conveying device 3 are taken out first. When all the pizzas on that side are taken out, the fourth motor 21 runs and drives the first connecting base 24 to rotate through the first reducer 22. Driven by the first connecting base 24, the first supporting plates 26 also rotates to make the first supporting plate 26 on another side facing the conveying device 3, then the conveying process is continued, and so on. When all the pizzas on the pizza storage device 2 are taken out, the operator may place new pizzas into the pizza storage device 2 again.

Figure 5:
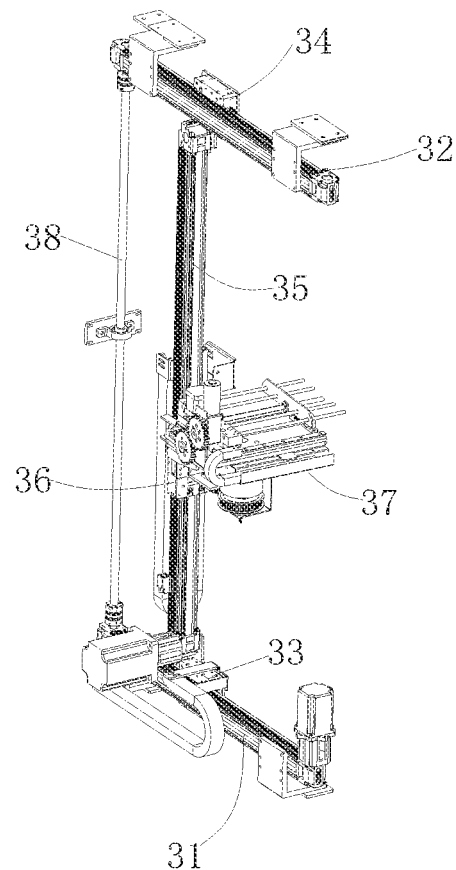
FIG. 5 is a schematic diagram of a conveying device according to one embodiment of the present disclosure.
Figure 6:
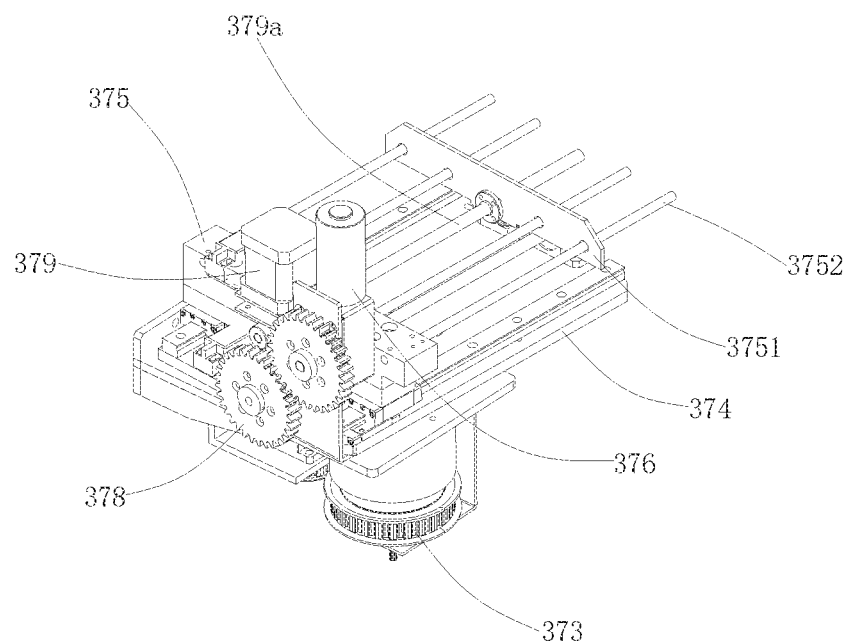
FIG. 6 is a first schematic diagram of a conveying mechanism according to one embodiment of the present disclosure.
Figure 7:
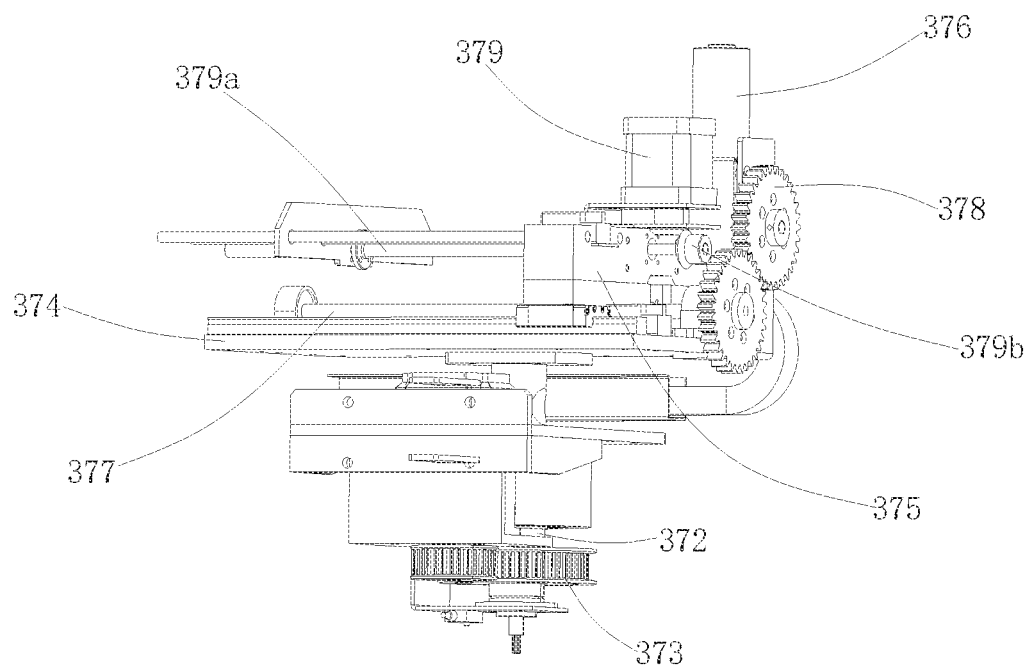
FIG. 7 is a second schematic diagram of the conveying mechanism according to one embodiment of the present disclosure.
Figure 8:
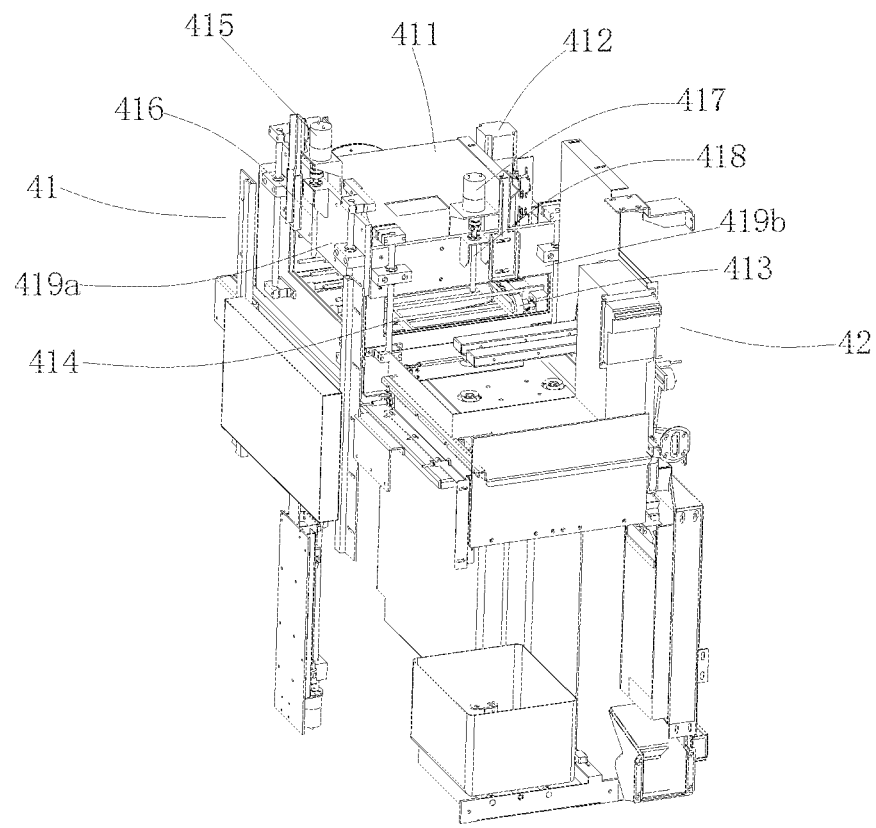
FIG. 8 is a first schematic diagram of a pizza baking and feeding device according to one embodiment of the present disclosure.
Figure 9:
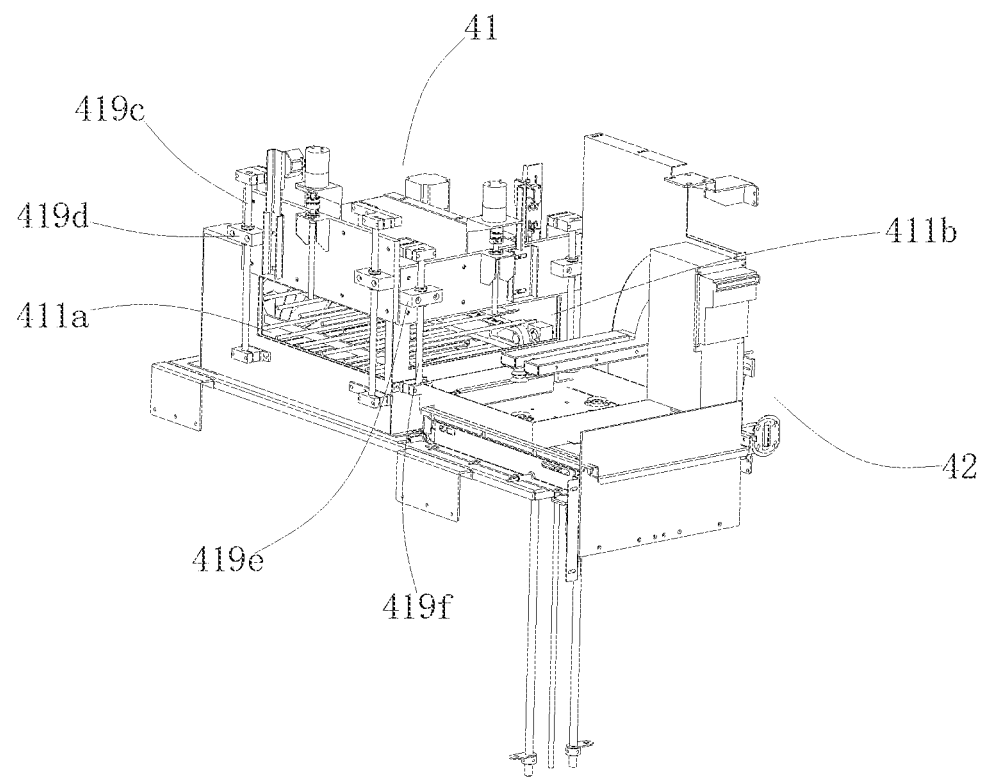
FIG. 9 is a second schematic diagram of the pizza baking and feeding device according to one embodiment of the present disclosure.
Figure 10:
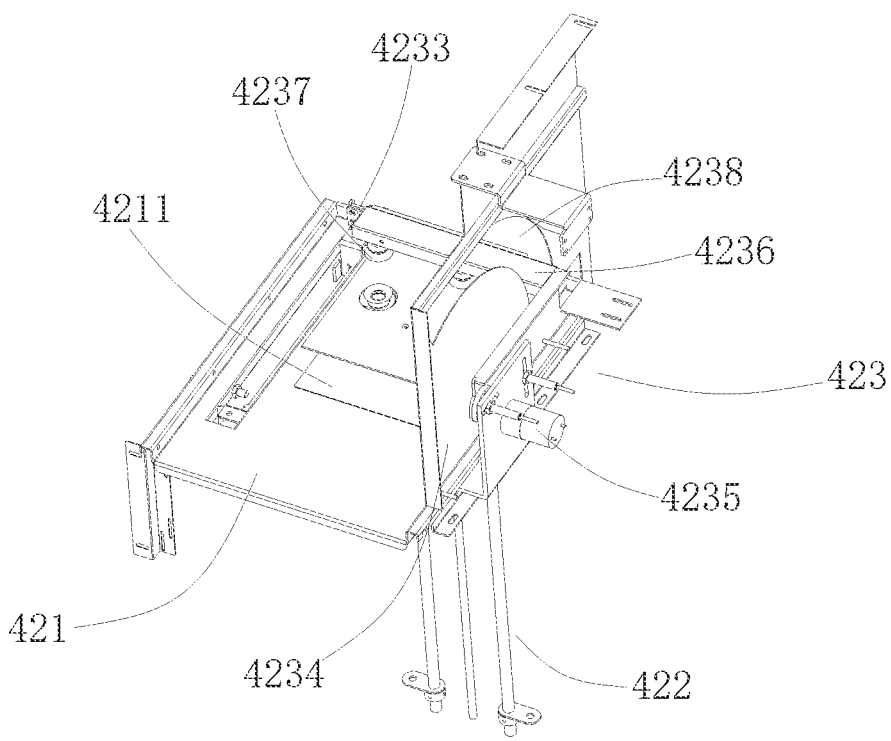
FIG. 10 is a first schematic diagram of a loading unit according to one embodiment of the present disclosure.
Figure 11:
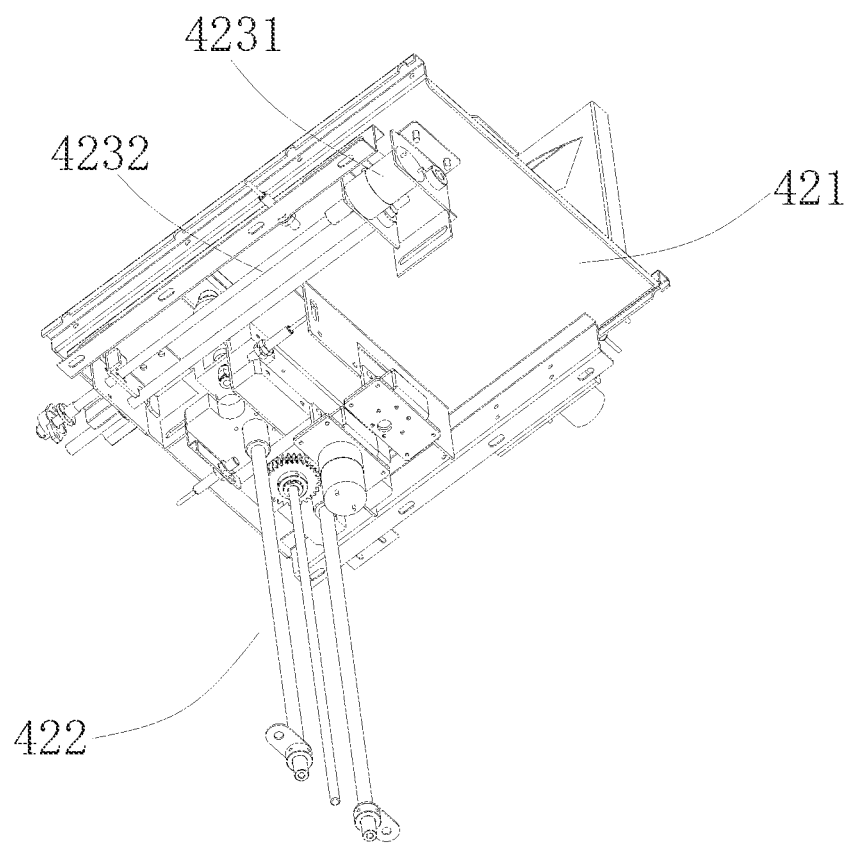
FIG. 11 is a second schematic diagram of the loading unit according to one embodiment of the present disclosure.
Figure 12:
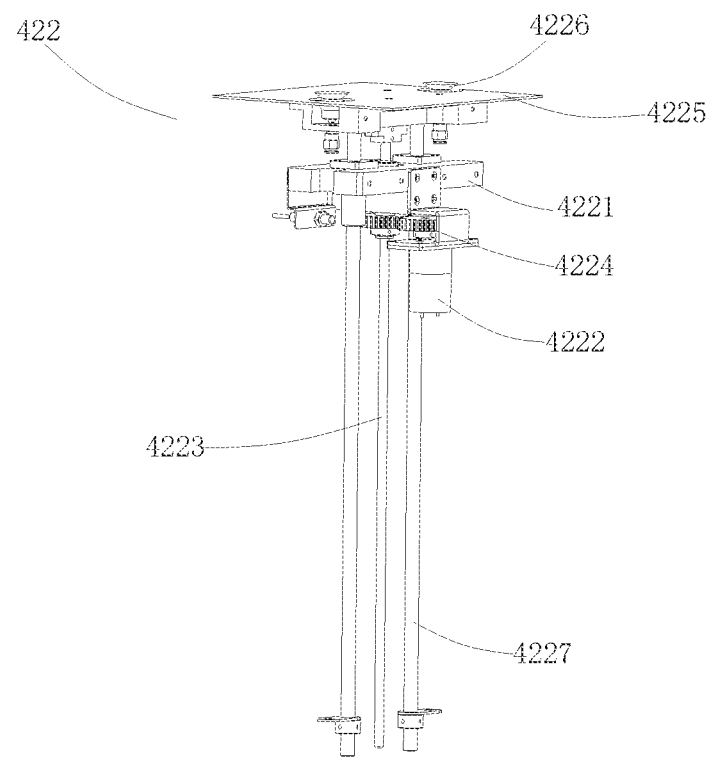
FIG. 12 is a schematic diagram of an upper support mechanism according to one embodiment of the present disclosure.

As shown in FIGS. 5-7, in the pizza vending machine according to one optional embodiment of the present disclosure, the conveying device 3 comprises a first driving mechanism 31, a first guide rail 32, a first moving base 33, a second moving base 34, a second driving mechanism 35, a third moving base 36, and a conveying mechanism 37. The first driving mechanism 31 is fixed on an inner bottom portion of the first cabinet 1. A moving end of the first driving mechanism 31 is connected with the first moving base 33. A bottom end of the second driving mechanism 35 is vertically connected with the first moving base 33. The first guide rail 32 is parallel to the first driving mechanism 31 and is fixed on an inner top portion of the first cabinet 1. A moving end of the first guide rail 32 is connected with the second moving base 34. A top end of the second driving mechanism 35 is connected to the second moving base 34. A moving end of the second driving mechanism 35 is connected with the third moving base 36. The conveying mechanism 37 is arranged on the third moving base 36. One end of the first driving mechanism 31 is connected with one end of the first guide rail 32 through a first positioning rod 38. The first positioning rod 38 is fixed to a side wall of the first cabinet 1.

In the embodiment, the first driving mechanism 31 and the second driving mechanism 35 are linear motors, but they are not limited to linear motors. Any mechanism that can realize linear driving function is also included in the first driving mechanism 31 and the second driving mechanism 35. The conveying mechanism 37 has a compact structure and a high degree of coordination. In order to ensure that the conveying mechanism 37 operates stably during a conveying process, the first driving mechanism 31 is provided to control a horizontal movement of the conveying mechanism 37. Further, the first guide rail 32 is arranged corresponding to the first driving mechanism 31, so the second driving mechanism 35 and the conveying mechanism 37 move smoothly in a horizontal direction, which strengthens stability of the conveying, and ensures that the pizza will not fall when the pizza is transferred from the pizza storage device 2 to the pizza baking and feeding device 4, and ensures hygiene of the pizza.

In addition, the first moving base 33 and the second moving base 34 are configured to connect with the moving end of the first driving mechanism 31 and the moving end of the first guide rail 32 on the one hand, and are configured to provide a supporting connection for the second driving mechanism 35 on the other hand. Therefore, the second driving mechanism 35 moves vertically and smoothly along a moving direction of the moving end of the first driving mechanism 31. In addition, the first moving base also plays a role in finely adjusting a position of the conveying mechanism 37. When the conveying mechanism 37 is taking out the pizza, positions of the first discharging columns 28 and a positions of second discharging columns diverge from each other. In this way, it is ensured that the second discharging columns are staggered with the first discharging columns 28 when taking out the pizza, so the pizza is taken out smoothly. The first moving base 33 and the second moving base 34 are always kept at a same vertical position when moving, which ensures that the conveying mechanism 37 maintains a horizontal state when moving, and is conducive to the horizontal movement of the conveying mechanism 37.

When conveying, a position of the pizza to be taken is determined first, then the moving end of the first driving mechanism 31 moves along a predetermined direction of the first driving mechanism 31, and the second driving mechanism 35 and the conveying mechanism 37 move accordingly to make the conveying mechanism 37 directly facing the position of the pizza to be taken. The moving end of the second driving mechanism 35 moves up and down so that the conveying mechanism 37 is facing positions of the first discharging columns 28 where the pizza is placed. After the conveying mechanism 37 is activated, if positions of the second discharging columns of the conveying mechanism 37 are not staggered with the first discharging columns 28, the moving end of the first driving mechanism 31 moves to finely adjust the position of the conveying mechanism 37, so that the second discharging columns of the conveying mechanism 37 are staggered with the first discharging columns 28.

As shown in FIGS. 5-7, in the pizza vending machine according to one optional embodiment of the present disclosure, the conveying mechanism comprises a rotating unit, a conveying unit, and a pushing unit. The conveying unit is arranged on the rotating unit. The pushing unit is arranged on the conveying unit. The rotating unit comprises a first motor, a first rotating shaft 372, a pulley transmission mechanism 373, and a first rotating base 374. A bottom portion of the first rotating shaft 372 and an output end of the first motor are driven by the pulley transmission mechanism 373. A top portion of the first rotating shaft 372 is fixed with the first rotating base 374. The second motor is arranged on the first rotating base 374. The conveying unit comprises a fourth moving base 375, a second motor 376, a first screw transmission mechanism 377, and a first gear transmission mechanism 378. The pushing unit comprises a third motor 379, a second screw transmission mechanism 379a, and a second gear transmission mechanism 379b. The first motor is arranged on the third moving base 36. A bottom portion of the first rotating shaft 372 is rotatably arranged on one side of the first motor. The first screw transmission mechanism 377 is arranged on the first rotating base 374 along a pizza conveying and discharging direction. One end of the first screw transmission mechanism 377 is connected with an output end of the second motor 376 through the first gear transmission mechanism 378. A moving end of the first screw transmission 377 mechanism is connected with the fourth moving base 375. An end surface of the fourth moving base 375 facing away from the first gear transmission mechanism 378 is connected with a pushing plate 3751 through the second screw transmission mechanism 379a. Second discharging columns 3752 parallel to the second screw transmission mechanism 379a are arranged on the fourth moving base 375. The pushing plate 3751 is sleeved on the second discharging columns 3752. The third motor 379 is arranged on the fourth moving base 375. An output end of the third motor 379 is connected to one end of the second screw transmission mechanism 379a through the second gear transmission mechanism 379b.

In the embodiment, the conveying mechanism 37 has a close mechanism, and the components are closely connected and are stably coordinated to achieve efficient conveying and feeding. Further, an occupied volume of the conveying mechanism 37 is simplified. The second discharging columns 3752 are side by side arranged on the fourth moving base 375 at intervals. A purpose of an arrangement of the second discharging columns 3752 is to facilitate cooperation with the first discharging columns 28 to take out the pizza.

In addition, a length of the pushing plate 3751 is greater than a length of the fourth moving base 375, which is beneficial to completely push the pizza, and also ensures that the pushing plate 3751 moves steadily.

When the conveying mechanism 37 is in operation, a working process is divided into three stages: conveying stage, transporting stage, and feeding stage.

When in the conveying stage, the position of the pizza to be taken is determined, the first rotating base 374 is facing the pizza storage device 2, and the first rotating base 374 moves to a horizontal position close to the pizza to be taken. The second motor 376 is activated and drives the first screw transmission mechanism 377 to rotate through the first gear transmission mechanism 378, Driven by the first screw transmission mechanism 377, the fourth moving base 375 moves forward toward the pizza to be taken, so the second discharging columns 3752 move below the first discharging columns 28. Then the second motor 376 closes, the second discharging column 3752 and the first discharging column 28 are staggered at this time. That is, the second discharging columns 3752 are located below gaps between the first discharging columns 28. When positions of the second discharging columns 3752 are adjusted correctly, the conveying mechanism 37 is controlled to rise, and the second discharging columns 3752 rises accordingly. The second discharging columns 3752 gradually pass through the gaps of the first discharging columns 28. Then, the second discharging columns 3752 abut against the pizza on the first discharging columns 28, and the second discharging columns 3752 continue to rise, making the pizza to rise accordingly. The second motor 376 restarts to drive the first screw transmission mechanism 377 to rotate, so that the fourth moving base 375 returns to an initial position and the second discharging columns 3752 bring the pizza back to the initial position.

When in the transporting stage, the conveying mechanism 37 moves to a position of the first window 11, the first motor is activated. The first motor drives the first rotating shaft 372 to rotate through the pulley transmission mechanism 373. The first rotating base 374 is driven by the first rotating shaft. 372 and is rotated 180°, so that the first rotating base 374 directly faces the position of the first window 11.

When in the feeding stage, the second motor 376 is activated to make the fourth moving base 375 moving toward the position of the first window 11. When the fourth moving base 375 moves to an end, the second discharging columns 3752 on the fourth moving base 375 move from the first window 11 to enter the second window and enter the pizza baking and feeding device 4, At this time, the second motor 376 stops and the third motor 379 is activated. The third motor 379 drives the second screw transmission mechanism 379a to rotate through the second gear transmission mechanism 379b. The moving end of the second screw transmission mechanism 379a drives the pushing plate 3751 to move. The pushing plate 3751 moves along a direction of the second screw transmission mechanism 379a and the second discharging columns 3752. The pushing plate 3751 pushes the pizza placed on the second discharging columns 3752 into the pizza baking and feeding device to complete the feeding.

The entire conveying, transporting and feeding process is carried out in an orderly manner, and each stage is completed in a short time. During the conveying, transporting, and feeding stages, various components cooperate with each other without causing confusion and are able to efficiently transport the pizza from the pizza storage device 2 to the pizza baking and feeding device. 4

As shown in FIGS. 8-12, in the pizza vending machine according to one optional embodiment of the present disclosure, the pizza baking and feeding device 4 comprises the baking unit 41 and the loading unit 42. The baking unit 41 comprises a baking box 411, a fifth motor 412, a conveying belt 413, third discharging columns 414, a sixth motor 415, a third screw transmission mechanism 416, a seventh motor 417, and a fourth screw transmission mechanism 418. The baking box 411 is arranged in the second cabinet. The baking box 411 comprises a feeding inlet 411a corresponding to the second window. The baking box 411 comprises a discharge outlet 411b on an end surface of the baking box 411 towards the loading unit 42. Heating pipes are respectively arranged on a top portion and a bottom portion of the baking box 411. The fifth motor 412 is arranged on one side of the baking box 411. The conveying belt 413 is arranged in the baking box 411 and is arranged between the heating pipes. The third discharging columns 414 are arranged on the conveying belt 413 at intervals. An output end of the fifth motor 412 is connected to the conveying belt 413 through a third gear transmission mechanism. The sixth motor 415 is fixed above the feeding inlet 411a. A first blocking door 419a is movable up and down to block the feeding inlet 411a. The third screw transmission mechanism 416 is vertically arranged on the first blocking door 419a. A moving end of the third screw transmission mechanism 416 is connected to the first blocking door 419a.

An output end of the sixth motor 415 is drivingly connected with one end of the third screw transmission mechanism 416. First guide rods 419c are arranged on a side of the baking box 411 where the feeding inlet 411a is located. First guide blocks 419d are arranged on the first blocking door 419a. Each first guide rod 419c passes through a respective first guide block 419d. The seventh motor 417 is fixed above the discharge outlet 411b. A second blocking door 419b is movable up and down to block the discharge outlet 411b. The fourth screw transmission mechanism 418 is vertically arranged on the second blocking door 419b. A moving end of the fourth screw transmission mechanism 418 is connected to the second blocking door 419b. An output end of the seventh motor 417 is drivingly connected with one end of the fourth screw transmission mechanism 418. Second guide rods 419f are arranged on a side of the baking box 511 where the discharge outlet 411b is located. Second guide blocks 419e are arranged on the second blocking door. Each second guide rod 419f passes through a respective second guide block 419e.

The loading unit 42 is arranged on one side of the baking box 411. The loading unit 42 is corresponding to the discharge outlet 411b.

In this embodiment, the third discharging columns 414 are arranged on the conveying belt 413 at interval through screws. Since the heating pipes of the baking box 411 are arranged on the top and bottom portions of the baking box 411, heat energy of the heating pipes is directed toward the pizza from top and bottom to bake and heat the pizza. Gaps between the third discharging columns 414 are conducive to heat dissipation and flow, which bakes the pizza fast and improves baking efficiency.

On the first blocking door 419a, two first guide blocks 419d are connected by screws, and the first guide blocks 419d are sleeved on the first guide rods 419c. The two first guide blocks 419d are respectively arranged on two opposite ends of the first blocking door 419a, which ensures that the first blocking door 419a move up and down stably, and blocks the feeding inlet 411a. A principle and structure of the second blocking door 419b are similar to the first blocking door 419a, and will not be described herein.

In addition, the first blocking door 419a and the second blocking door 419b on the baking box 411 are closed during the baking process. The first blocking door 419a and the second blocking door 419b are made of heat-insulating materials, which effectively prevent heat leakage. When the conveying mechanism 37 feeds the pizza into the baking box 411, the first blocking door 419a is opened. When the baking process is completed, the second blocking door 419b is opened. The first blocking door 419a and the second blocking door 419b are usually in a closed state, which is beneficial to maintain sanitation in the baking box 411, and also prevents external bacteria from entering the baking box 411.

After the pizza is put into the baking box 411, the conveying mechanism 37 withdraws from the baking box 411, the first blocking door 419a is closed, and the heating pipes in the baking box 411 start to bake the pizza.

After the baking process is completed, the second blocking door 419b is opened, and the fifth motor 412 is activated. The fifth motor 412 drives the conveying belt 413 to move toward the discharge outlet 411b through the third gear transmission mechanism. The third discharging columns 414 move along with the conveying belt 413. Driven by the third discharging columns 414, the pizza is gradually moved out of the baking box 411, and falls into the loading unit 42 for loading. The baking process is simple and fast. After baking, the pizza is directly transferred to the loading unit 42 for direct loading. The pizza does not need to touch other devices or components, which is hygienic/The pizza maintains the heat when it is delivered to the customer while, which satisfies needs of the customer to enjoy fast food.

As shown in FIGS. 8-12, in the pizza vending machine according to one optional embodiment of the present disclosure, the loading unit 42 comprises a machine table 421, an upper supporting mechanism 422, and a box packaging mechanism 423.

The upper supporting mechanism 422 comprises a fixing base 4221, an eighth motor 4222, a fifth screw transmission mechanism 4223, a fourth gear transmission mechanism 4224, and a conveying platform 4225. The machine table 421 comprises a loading window 4211. The fixing base 4221 corresponds to the loading window 4211 and is arranged on the machine table 421. The eighth motor 422 is fixed on the fixing base 4221. A moving end of the fifth screw transmission mechanism 4223 is fixed on the fixing base 4221. The fifth screw transmission mechanism 4223 is drivingly connected to an output end of the eighth motor 4222 through the fourth gear transmission mechanism 4224. A top portion of the fifth screw transmission mechanism 4223 is connected with the conveying platform 4225. First suction cups 4226 are arranged on an upper surface of the conveying platform 4225.

Two third guide rods 4227 are arranged side by side on two sides of the fifth screw transmission mechanism 4223. The two third guide rods 4227 pass through the fixing base 4221 and the conveying platform 4225 in sequence.

The box packaging mechanism 423 is arranged on one side of the loading window 4211.

In the embodiment, the machine table 421 is arranged next to the baking box 411. The upper supporting mechanism 422 is configured to take out a packaging box from the packaging box storage device 5 and transport the packaging box to the machine table 421 to complete packaging of the pizza. The two third guide rods 4227 are arranged in parallel on two sides of the fifth screw transmission mechanism 4223, which is conductive to guiding and stabilizing an operation of the conveying platform 4225.

In use, when the customer has completed the payment, the upper supporting mechanism 422 is activated and the eighth motor 4222 is activated. The output end of the eighth motor 4222 starts to rotate. The eighth motor 4222 drives the fifth screw transmission mechanism 4223 through the fourth gear transmission mechanism 4224 to move. Because the moving end of the fifth screw transmission mechanism 4223 is fixed on the fixing base 4221, a screw rod of the fifth screw transmission mechanism 4223 rotates and continues to stretch upward. At this time, the conveying platform 4225 connected to the top portion of the fifth screw transmission mechanism 4223 moves upwards accordingly until it reaches the packaging box storage device 5. The first suction cups 4226 on the conveying platform 4225 suck down a packaging box, and then the eighth motor 4222 rotates to drive the fifth screw transmission mechanism 4223 to reset, so that the conveying platform 4225 returns to the machine table 421 to pack the pizza.

As shown in FIGS. 8-12, in the pizza vending machine according to one optional embodiment of the present disclosure, the box packaging mechanism 423 comprises a ninth motor 4231, a sixth screw transmission mechanism 4232, a unloading pushing plate 4233, a limit plate 4234, a tenth motor 4235, and a box opening block 4236. The ninth motor 4231 is fixed on the machine table 421. An output end of the ninth motor 4231 is drivingly connected with the sixth screw transmission mechanism 4232. The sixth screw transmission mechanism 4232 is arranged on the machine table 421 along a pizza discharging direction. A moving end of the sixth screw transmission mechanism 4232 is connected to the unloading pushing plate 4233. The unloading pushing plate 4233 is arranged above the conveying platform 4225. The limit plate 4234 is vertically arranged on one side of the machine table 421. An arc-shaped limit groove 4238 is arranged on the limit plate 4234. The tenth motor 4235 is fixed on one side of the limit plate 4234. The tenth motor 4235 is located at an arc center of an arc where the limit groove is located. The box opening block 4236 is arranged in an inverted "L" shape. One end of the box opening block 4236 extends from the arc-shaped limit groove 4238 and is arranged above the conveying platform 4225. Second suction cups 4237 are connected to an extended end of the box opening block 4236.

In the embodiment, the unloading pushing plate 4233 is configured to push the packed pizza and pizza box from the conveying platform 4225, and push it to a delivery port of the second cabinet. The customer can get the pizza from the delivery port.

The ninth motor 4231 is fixed on the machine table 421 by a bracket and screws. The sixth screw transmission mechanism 4232 is arranged under the machine table 421. The sixth screw transmission mechanism 4232 is arranged along the pizza discharging direction.

In addition, the limit plate 4234 is provided with the limit groove 4238 according to a movement process of the box opening block 4236 to limit a movement process of the box opening block 4236, so the box opening block 4236 moves smoothly. In addition, the method of opening and closing the box is simple and quick, does not cost too much operating time, reduces waiting time of the customer, and improves goodwill of the customer.

When in use, the upper supporting mechanism 422 takes the packaging box and transports it to the machine table 421, the tenth motor 4235 turns on, the output end of the tenth motor 4235 rotates 90°, and drives the box opening block 4236 to rotate 90°. Then the box opening block 4236 is rotated to a top portion of the conveying platform 4225, and the second suction cups 4237 of the box opening block 4236 suck a cover of the packaging box. The tenth motor 4235 reversely rotates 90° and drives the box opening block 4236 to reversely rotate 90°. The second suction cups 4237 of the box opening block 4236 suck the cover of the packaging box and rotates to open the packaging box so that the pizza is be directly loaded into the packaging box. When the pizza is packed, the tenth motor 4235 rotates and drives the box opening block 4236 to rotate 90° to close the cover again.

The ninth motor 4231 starts to rotate, driving the sixth screw transmission mechanism 4232 to rotate. The moving end of the sixth screw transmission mechanism 4232 drives the unloading pushing plate 4233 to move toward the pizza discharging direction, and then push the pizza to the delivery port to complete fast delivery.

Figure 13:
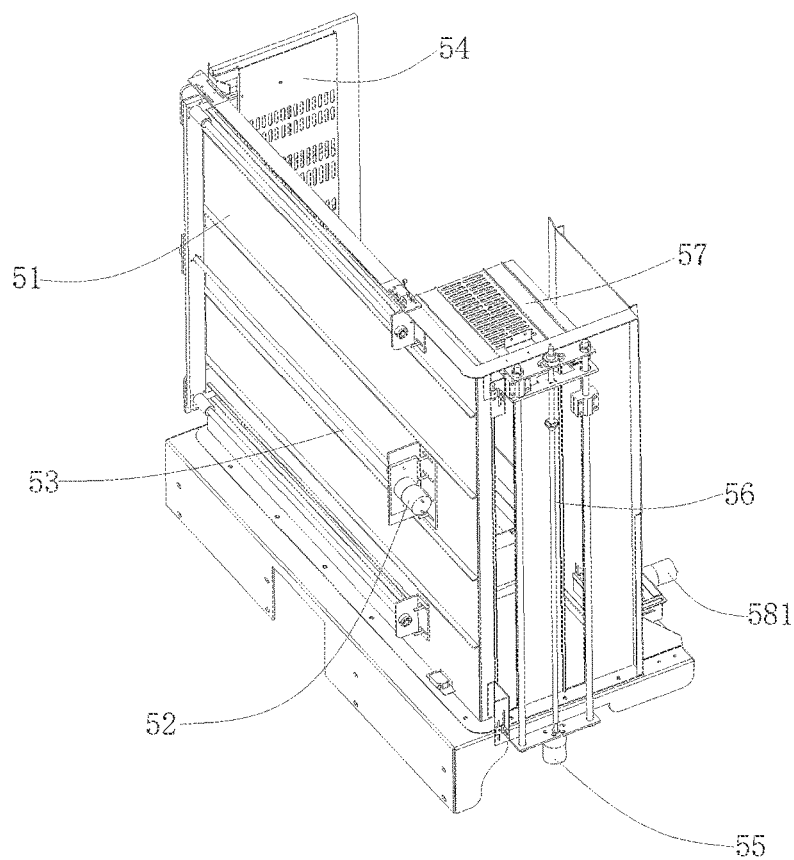
FIG. 13 is a first schematic diagram of a packaging box storage device according to one embodiment of the present disclosure.
Figure 14:
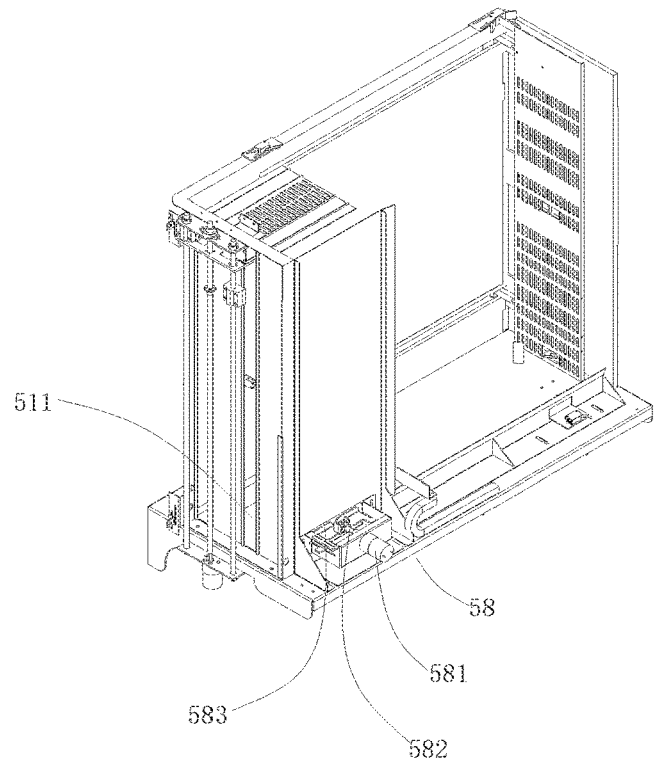
FIG. 14 is a second schematic diagram of the packaging box storage device according to one embodiment of the present disclosure.

As shown in FIGS. 13 and 14, in the pizza vending machine according to one optional embodiment of the present disclosure, the packaging box storage device 5 comprises a storage box 51, an eleventh motor 52, a seventh screw transmission mechanism 53, a box pushing plate 54, a twelfth motor 55, an eighth screw transmission mechanism 56, a box compacting plate 57, and a clamping mechanism 58. The storage box 51 is arranged above the pizza baking and feeding device 4. The storage box 51 comprises a box outlet 511 configured to move the packaging box to the pizza baking and feeding device 4. The eleventh motor 52 is fixed on an outer side wall of the storage box 51. An output end of the eleventh motor 52 is drivingly connected with one end of the seventh screw transmission mechanism 53. The seventh screw transmission mechanism 53 is arranged on the storage box 51 along a packing box feeding direction. A moving end of the seventh screw transmission mechanism 53 is connected to the box pushing plate 54. The box pushing plate 54 extends into the storage box 51 to push the packaging box stored in the storage box 51 to the box outlet 511. The twelfth motor 55 is fixed on an outer side wall close to the box outlet 511 of the storage box 51. An output end of the twelfth motor 55 is drivingly connected with one end of the eighth screw transmission mechanism 56. The eighth screw transmission mechanism 56 is vertically arranged above the twelfth motor 55. A moving end of the eighth screw transmission mechanism 56 is connected to the box compacting plate 57. The box compacting plate 57 extends into the storage box 51 to compact stacked packaging boxes. The clamping mechanism 58 is arranged on one side of the box outlet 511 and is arranged on a bottom portion of the storage box 51.

In the embodiment, a box loading port is provided on one side of the storage box 51. The operator puts the stacked packaging boxes in the storage box from the box loading port, and three stacks of packaging boxes can be put in the storage box 51.

When in use, the packaging boxes are placed on one side of the storage box 51, and the packaging boxes are placed against a side wall of the storage box 51. The output end of the eleventh motor 52 rotates, and the eleventh motor 52 drives the moving end of the seventh screw transmission mechanism 53 to move, thereby moving the box pushing plate 54 toward a direction of the box outlet 511. Then, the box pushing plate 54 push the stacked packaging boxes out of the box outlet 511. At this time, the upper supporting mechanism 422 is at a position of the box outlet 511, and a stack of packaging boxes is pushed onto the conveying platform 4225 under action of the box pushing plate 54. The output end of the twelfth motor 55 rotates to control a movement of the moving end of the eighth screw transmission mechanism 56 so that the box compacting plate 57 is compacted against atop portion of the stacked packaging boxes. There are no gaps between the stacked packaging boxes and the packaging boxes are stacked vertically to ensure that the packaging boxes do not fall apart.

As shown in FIGS. 13 and 14, in the pizza vending machine according to one optional embodiment of the present disclosure, the clamping mechanism 58 comprises a clamping motor 581, a ninth screw transmission mechanism 582, and a clamping plate 583. The clamping motor 581 is fixed on a bottom portion of the storage box 51. An output end of the clamping motor 581 is drivingly connected with the ninth screw transmission mechanism 582. The ninth screw transmission mechanism 582 is horizontally arranged on a side of the box outlet 511. A moving end of the ninth screw transmission mechanism 582 is connected to the clamping plate 583. The clamping plate 583 extends into the storage box 51 to make a bottommost packaging box of the stacked packaging boxes abutting against an inner side wall of the storage box 51.

An end surface of the clamping plate 583 towards the storage box 51 is a plane.

When in use, after the stacked packaging boxes are fixed, the upper supporting mechanism 422 moves a distance equal to a thickness of one packaging box. Then the output end of the clamping motor 581 rotates, and the clamping motor 581 controls the clamping plate 583 to move toward a position of a penultimate packaging box through the ninth screw transmission mechanism 582. The clamping plate 583 clamps the penultimate packaging box on the side wall of the storage box 51. At this time, the clamping plate 583 provides a squeezing force to the penultimate packaging box, so that the stacked packaging boxes are firmly arranged in the storage box 51. The upper supporting mechanism 422 moves the sucked last packaging box down to the machine table 421 for packaging. The rest packaging boxes are conveyed in a same manner. The upper supporting mechanism 422 takes out the packaging boxes from the storage box 51 one by one.

In the pizza vending machine according to one optional embodiment of the present disclosure, the pizza vending machine is driven by motors. Since shopping malls, streets, etc. can provide power everywhere, motor drive is more convenient and reliable than cylinder drive.

Base on above embodiments of the pizza vending machine, the present disclosure provides an automatic pizza selling system.

The automatic pizza selling system comprises the pizza vending machine mentioned above, a control device electrically connected to the pizza vending machine and configured to obtain an order payment completion signal to turn on the pizza vending machine, a coin device connected with the control device, and a mobile payment device connected with the control device.

The coin device is configured to generate the order payment completion signal after a user puts a minor or currency, then the coin device transmits the order payment completion signal to the control device. The mobile payment device is configured to generate the order payment completion signal after the user scans a payment code, then the mobile payment device transmits the order payment completion signal to the control device.

The present disclosure discloses the pizza vending machine including the first cabinet 1 provided with the first window 11, the second cabinet arranged on one side of the first cabinet 1 and provided with the second window corresponding to the first window 11, the pizza storage device 2 arranged in the first cabinet 1 to store the pizzas, the conveying device 3 arranged in the first cabinet 1 and corresponding to the first window 11, the pizza baking and feeding device 4, and the packaging box storage device 5 arranged in the second cabinet. The conveying device 3 is arranged on the side of the pizza storage device 2 to take the pizza out from the pizza storage device 2 and transfer the pizza out of the first cabinet 1 from the feeding window. The pizza baking and feeding device 4 is arranged in the second cabinet and is corresponding to the second window to make the baking pizza to be packaged and taken out. The packaging box storage device 5 is arranged corresponding to the pizza baking and feeding device 4 and is arranged in the second cabinet to make the packaging box falling into the pizza baking and feeding device 4 to complete packaging. The pizza vending machine may be placed in malls, streets, and other people's intensive places, which is convenient for people to buy the pizza when they over time or get off work. Moreover, the pizza vending machine achieves unmanned baking, packaging and trafficking, which is very convenient and fast and is suitable for people lived in quick-paced life. In addition, baking and packaging of the pizza are realized by providing the pizza storage device 2, the conveying device 3, the pizza baking and feeding device 4, and packaging box storage device 5 in the present disclosure. A whole process is reliable, the operation is simple, fast, and time-consuming, and further meets the fast food demand for people.

Technical features of the above-mentioned embodiments can be combined arbitrarily. In order to make the description concise, all possible combinations of the various technical features in the above-mentioned embodiments are not described. However, as long as there is no contradiction in the combination of these technical features, they should be considered as within the scope of the specification.

The above are only optional embodiments of the present disclosure, and do not intend to limit the present disclosure in any form. Anyone skilled in the art, without departing from the scope of the technical solutions of the present disclosure, can use methods and technical content disclosed above to make many possible changes and modifications to the technical solution of the present disclosure, or modify them into equivalent embodiments. Therefore, any content that does not deviate from the technical solutions of the present disclosure, and equivalent changes made according to the shape, structure, and principle of the present disclosure, shall fall within the protection scope of the present disclosure.

What is claimed is:

1. A conveying device arranged in a pizza vending machine, comprising:
   a first driving mechanism;
   a first guide rail;
   a first moving base;
   a second moving base;
   a second driving mechanism;
   a third moving base; and
   a conveying mechanism;
   wherein the second driving mechanism is arranged on the first moving base; the third moving base is connected with a moving end of the second driving mechanism; the conveying mechanism is arranged on the third moving base; the first driving mechanism and the first guide rail are arranged side by side on a box body of the pizza vending machine; the first moving base is fixed on a moving end of the first driving mechanism; the second moving base is fixed on a moving end of the first guide rail;
   wherein the conveying mechanism comprises a rotating unit, a conveying unit, and a pushing unit; the rotating unit is arranged on the third moving base; the conveying unit is arranged on the rotating unit; the pushing unit is arranged on the conveying unit
   wherein the rotating unit comprises a first motor, a first rotating shaft, a pulley transmission mechanism, and a first rotating base; the first motor is arranged on the third moving base; a bottom portion of the first rotating shaft is rotatably arranged on one side of the first motor; the bottom portion of the first rotating shaft and an output end of the first motor are driven by the pulley transmission mechanism; a top portion of the first rotating shaft is fixed with the first rotating base, the conveying unit is arranged on the first rotating base.

2. The conveying device according to claim 1, wherein a first positioning rod is connected between one end of the first moving base and one end of the first guide rail; the one end of the first moving base and the one end of the first guide rail are arranged at a same side of the conveying device; the first positioning rod is connected with the box body of the pizza vending machine.

3. The conveying device according to claim 2, wherein the second driving mechanism is a second linear motor.

4. The conveying device according to claim 1, wherein the first driving mechanism is a first linear motor.

5. The conveying device according to claim 1, wherein the conveying unit comprises a fourth moving base, a second motor, a first screw transmission mechanism, and a first gear transmission mechanism; the second motor is arranged on the first rotating base; the first screw transmission mechanism is arranged on the first rotating base along a pizza conveying and discharging direction; one end of the first screw transmission mechanism is connected with an output end of the second motor through the first gear transmission mechanism; a moving end of the first screw transmission mechanism is connected with the fourth moving base.

6. The conveying device according to claim 5, wherein the pushing unit comprises a third motor, a second screw transmission mechanism, and a second gear transmission mechanism; an end surface of the fourth moving base facing away from the first gear transmission mechanism is connected with a pushing plate through the second screw transmission mechanism; second discharging columns parallel to the second screw transmission mechanism are arranged on the fourth moving base; the pushing plate is sleeved on the second discharging columns; the third motor is arranged on the fourth moving base; an output end of the third motor is connected to one end of the second screw transmission mechanism through the second gear transmission mechanism.

7. A pizza vending machine, comprising:
   a first cabinet provided with a first window;
   a second cabinet arranged on one side of the first cabinet and provided with a second window corresponding to the first window;
   a pizza storage device arranged in the first cabinet to store pizza;
   a conveying device arranged in the first cabinet and corresponding to the first window;
   a pizza baking and feeding device; and
   a packaging box storage device arranged in the second cabinet;
   wherein the conveying device is arranged on the side of the pizza storage device to take a pizza out from the pizza storage device and transfer the pizza out of the first cabinet from a feeding window; the pizza baking and feeding device comprises a baking unit and a loading unit; the baking unit is arranged in the second cabinet and is corresponding to the second window; the loading unit is arranged on one side of the baking unit; the packaging box storage device is arranged corresponding to the pizza baking and feeding device and is arranged in the second cabinet to make a packaging box falling into the pizza baking and feeding device to complete packaging
   wherein the conveying device comprises a first driving mechanism, a first guide rail, a first moving base, a second moving base, a second driving mechanism, a third moving base, and a conveying mechanism; the first driving mechanism is fixed on an inner bottom portion of the first cabinet; a moving end of the first driving mechanism is connected with the first moving base; a bottom end of the second driving mechanism is vertically connected with the first moving base; the first guide rail is parallel to the first driving mechanism and is fixed on an inner top portion of the first cabinet; a moving end of the first guide rail is connected with the second moving base; a top end of the second driving mechanism is connected to the second moving base; a moving end of the second driving mechanism is connected with the third moving base; the conveying mechanism is arranged on the third moving base; one end of the first driving mechanism is connected with one end of the first guide rail through a first positioning rod; the first positioning rod is fixed to a side wall of the first cabinet;

wherein the conveying mechanism comprises a first motor, a first rotating shaft, a pulley transmission mechanism, a first rotating base, a fourth moving base, a second motor, a first screw transmission mechanism, a first gear transmission mechanism, a third motor, a second screw transmission mechanism, and a second gear transmission mechanism; the first motor is arranged on the third moving base; a bottom portion of the first rotating shaft is rotatably arranged on one side of the first motor; the bottom portion of the first rotating shaft and an output end of the first motor are driven by the pulley transmission mechanism; a top portion of the first rotating shaft is fixed with the first rotating base; the second motor is arranged on the first rotating base; the first screw transmission mechanism is arranged on the first rotating base along a pizza conveying and discharging direction; one end of the first screw transmission mechanism is connected with an output end of the second motor through the first gear transmission mechanism; a moving end of the first screw transmission mechanism is connected with the fourth moving base; an end surface of the fourth moving base facing away from the first gear transmission mechanism is connected with a pushing plate through the second screw transmission mechanism; second discharging columns parallel to the second screw transmission mechanism are arranged on the fourth moving base; the pushing plate is sleeved on the second discharging columns; the third motor is arranged on the fourth moving base; an output end of the third motor is connected to one end of the second screw transmission mechanism through the second gear transmission mechanism.

8. The pizza vending machine according to claim 7, wherein the pizza storage device comprises a fourth motor, a first reducer, a second rotating shaft, a first connecting base, a second connecting base, a plurality of first supporting plates, and a plurality of first supporting frames; the fourth motor is arranged in the first cabinet; an output end of the fourth motor is connected with an input end of the first reducer; an output end of the first reducer is keyed to the first connecting base; the second rotating shaft is arranged in the first cabinet through a first bearing; the second connecting base is keyed to the second rotating shaft; the first connecting base and the second connecting base are arranged opposite to each other; and a bottom end of each first supporting plate is fixed to the first connecting base; a top end of each first supporting plate is fixed to the second connecting base; the plurality of first supporting frames are arranged on each first supporting plates at intervals; a root portion of each first supporting frame is connected to a corresponding first supporting plate; each first supporting frame extends away from a central axis of the second rotating shaft; first discharging columns are arranged at intervals on an end surface of each first supporting frame facing away from the corresponding first supporting plate.

9. The pizza vending machine according to claim 7, wherein the baking unit comprises a baking box, a fifth motor, a conveying belt, third discharging columns, a sixth motor, a third screw transmission mechanism, a seventh motor, and a fourth screw transmission mechanism; the baking box is arranged in the second cabinet; the baking box comprises a feeding inlet corresponding to the second window; the baking box comprises a discharge outlet on an end surface of the baking box towards the loading unit; heating pipes are respectively arranged on a top portion and a bottom portion of the baking box; the fifth motor is arranged on one side of the baking box; the conveying belt is arranged in the baking box and is arranged between the heating pipes; the third discharging columns are arranged on the conveying belt at intervals, an output end of the fifth motor is connected to the conveying belt through a third gear transmission mechanism; the sixth motor is fixed above the feeding inlet; a first blocking door is movable up and down to block the feeding inlet; the third screw transmission mechanism is vertically arranged on the first blocking door; a moving end of the third screw transmission mechanism is connected to the first blocking door; an output end of the sixth motor is drivingly connected with one end of the third screw transmission mechanism; first guide rods are arranged on a side of the baking box where the feeding inlet is located; first guide blocks are arranged on the first blocking door; each first guide rod passes through a respective first guide block; the seventh motor is fixed above the discharge outlet; a second blocking door is movable up and down to block the discharge outlet; the fourth screw transmission mechanism is vertically arranged on the second blocking door; a moving end of the fourth screw transmission mechanism is connected to the second blocking door, an output end of the seventh motor is drivingly connected with one end of the fourth screw transmission mechanism;

second guide rods are arranged on a side of the baking box where the discharge outlet is located; second guide blocks are arranged on the second blocking door; each second guide rod passes through a respective second guide block; the loading unit is arranged on one side of the baking box; the loading unit corresponding to the discharge outlet.

10. The pizza vending machine according to claim 9, wherein the loading unit comprises a machine table, an upper supporting mechanism, and a box packaging mechanism;

wherein the upper supporting mechanism comprises a fixing base, an eighth motor, a fifth screw transmission mechanism, a fourth gear transmission mechanism, and a conveying platform; the machine table comprises a loading window; the fixing base corresponds to the loading window and is arranged on the machine table; the eighth motor is fixed on the fixing base; a moving end of the fifth screw transmission mechanism is fixed on the fixing base; the fifth screw transmission mechanism is drivingly connected to an output end of the eighth motor through the fourth gear transmission mechanism; a top portion of the fifth screw transmission mechanism is connected with the conveying platform; first suction cups are arranged on an upper surface of the conveying platform;

wherein two third guide rods are arranged side by side on two sides of the fifth screw transmission mechanism; the two third guide rods pass through the fixing base and the conveying platform in sequence;

wherein the box packaging mechanism is arranged on one side of the loading window.

11. The pizza vending machine according to claim 10, wherein the box packaging mechanism comprises a ninth motor, a sixth screw transmission mechanism, a unloading pushing plate, a limit plate, a tenth motor, and a box opening block; the ninth motor is fixed on the machine table; an output end of the ninth motor is drivingly connected with the sixth screw transmission mechanism; the sixth screw transmission mechanism is arranged on the machine table along a pizza discharging direction; a moving end of the sixth screw transmission mechanism is connected to the unloading pushing plate; the unloading pushing plate is arranged above the conveying platform; the limit plate is vertically arranged on one side of the machine table; an arc-shaped limit groove is arranged on the limit plate; the tenth motor is fixed on one side of the limit plate; the tenth motor is located at an arc center of an arc were the limit groove is located; the box opening block is arranged in an inverted "L" shape, one end of the box opening block extends from the limit groove and is arranged above the conveying platform; second suction cups are connected to an extended end of the box opening block.

12. The pizza vending machine according to claim 7, wherein the packaging box storage device comprises a storage box, an eleventh motor, a seventh screw transmission mechanism, a box pushing plate, a twelfth motor, an eighth screw transmission mechanism, a box compacting plate, and a clamping mechanism; the storage box is arranged above the pizza baking and feeding device; the storage box comprises a box outlet configured to move the packaging box to the pizza baking and feeding device; the eleventh motor is fixed on an outer side wall of the storage box; an output end of the eleventh motor is drivingly connected with one end of the seventh screw transmission mechanism; the seventh screw transmission mechanism is arranged on the storage box along a packing box feeding direction, a moving end of the seventh screw transmission mechanism is connected to the box pushing plate; the box pushing plate extends into the storage box to push the packaging box stored in the storage box to the box outlet; the twelfth motor is fixed on an outer side wall close to the box outlet of the storage box; an output end of the twelfth motor is drivingly connected with one end of the eighth screw transmission mechanism; the eighth screw transmission mechanism is vertically arranged above the twelfth motor; a moving end of the eighth screw transmission mechanism is connected to the box compacting plate; the box compacting plate extends into the storage box to compact stacked packaging boxes; the clamping mechanism is arranged on one side of the box outlet and is arranged on a bottom portion of the storage box.

13. The pizza vending machine according to claim 12, wherein the clamping mechanism comprises a clamping motor, a ninth screw transmission mechanism, and a clamping plate, the clamping motor is fixed on a bottom portion of the storage box;
   an output end of the clamping motor is drivingly connected with the ninth screw transmission mechanism; the ninth screw transmission mechanism is horizontally arranged on a side of the box outlet; a moving end of the ninth screw transmission mechanism is connected to the clamping plate; the clamping plate extends into the storage box to make a bottommost packaging box of the stacked packaging boxes abutting against an inner side wall of the storage box;
   wherein an end surface of the clamping plate towards the storage box is a plane.

14. An automatic pizza selling system, comprising:
   a pizza vending machine;
   a control device electrically connected to the pizza vending machine and configured to obtain an order payment completion signal to turn on the pizza vending machine;
   a coin, device connected with the control device; and
   a mobile payment device connected with the control device;
   wherein the coin device is configured to generate the order payment completion signal after a user puts a minor or currency, then the coin device transmits the order payment completion signal to the control device; the mobile payment device is configured to generate the order payment completion signal after the user scans a payment code, then the mobile payment device transmits the order payment completion signal to the control device
   wherein the pizza vending machine comprises a first cabinet provided with a first window, a second cabinet arranged on one side of the first cabinet and provided with a second window corresponding to the first window, a pizza storage device arranged in the first cabinet to store pizza, a conveying device arranged in the first cabinet and corresponding to the first window, a pizza baking and feeding device, and a packaging box storage device arranged in the second cabinet;
   wherein the conveying device is arranged on the side of the pizza storage device to take a pizza out from the pizza storage device and transfer the pizza out of the first cabinet from a feeding window; the pizza baking and feeding device comprises a baking unit and a loading unit; the baking unit is arranged in the second cabinet and is corresponding to the second window; the loading unit is arranged on one side of the baking unit; the packaging box storage device is arranged corresponding to the pizza baking and feeding device and is arranged in the second cabinet to make a packaging box falling into the pizza baking and feeding device to complete packaging
   wherein the conveying device comprises a first driving mechanism, a first guide rail, a first moving base, a second moving base, a second driving mechanism, a third moving base, and a conveying mechanism; the first driving mechanism is fixed on an inner bottom portion of the first cabinet; a moving end of the first driving mechanism is connected with the first moving base; a bottom end of the second driving mechanism is vertically connected with the first moving base; the first guide rail is parallel to the first driving mechanism and is fixed on an inner top portion of the first cabinet; a moving end of the first guide rail is connected with the second moving base; a top end of the second driving mechanism is connected to the second moving base; a moving end of the second driving mechanism is connected with the third moving base; the conveying mechanism is arranged on the third moving base; one end of the first driving mechanism is connected with one end of the first guide rail through a first positioning rod; the first positioning rod is fixed to a side wall of the first cabinet
   wherein the conveying mechanism comprises a first motor; a first rotating shaft, a pulley transmission mechanism, a first rotating base, a fourth moving base, a second motor, a first screw transmission mechanism, a first gear transmission mechanism, a third motor, a second screw transmission mechanism, and a second gear transmission mechanism; the first motor is arranged on the third moving base; a bottom portion of the first rotating shaft is rotatably arranged on one side of the first motor, the bottom portion of the first rotating shaft and an output end of the first motor are driven by the pulley transmission mechanism; a top portion of the first rotating shaft is fixed with the first rotating base;

the second motor is arranged on the first rotating base; the first screw transmission mechanism is arranged on the first rotating base along a pizza conveying and discharging direction, one end of the first screw transmission mechanism is connected with an output end of the second motor through the first gear transmission mechanism; a moving end of the first screw transmission mechanism is connected with the fourth moving base; an end surface of the fourth moving base facing away from the first gear transmission mechanism is connected with a pushing plate through the second screw transmission mechanism; second discharging columns parallel to the second screw transmission mechanism are arranged on the fourth moving base; the pushing plate is sleeved on the second discharging columns; the third motor is arranged on the fourth moving base; an output end of the third motor is connected to one end of the second screw transmission mechanism through the second gear transmission mechanism.

\* \* \* \* \*